United States Patent
Yoshimizu et al.

(10) Patent No.: US 6,938,531 B2
(45) Date of Patent: Sep. 6, 2005

(54) RECIPROCAL-MOVEMENT POWER TOOL (75) Inventors: Chikai Yoshimizu, Hitachinaka (JP); Masao Kikumoto, Hitachinaka (JP); Takahiko Shimada, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 10/221,102

(22) PCT Filed: Feb. 2, 2001

(86) PCT No.: PCT/JP01/00757

§ 371 (c)(1),
(2), (4) Date: Sep. 9, 2002

(87) PCT Pub. No.: WO01/74522

PCT Pub. Date: Oct. 11, 2001

(65) Prior Publication Data

US 2003/0029295 A1 Feb. 13, 2003

(30) Foreign Application Priority Data

Mar. 31, 2000 (JP) .......................................... 2000-96787

(51) Int. Cl.$^7$ ................................................ B26B 1/06
(52) U.S. Cl. ............................ 83/631; 30/241; 30/228; 192/141; 192/143; 222/390; 74/424.71; 72/454
(58) Field of Search .......................... 30/228, 241, 182, 30/180; 83/631; 74/424.71, 425; 192/141, 143; 222/390; 72/454

(56) References Cited

U.S. PATENT DOCUMENTS

| 3,052,980 | A | * | 9/1962 | Fieser | 30/228 |
| 3,178,816 | A | * | 4/1965 | Schmid | 30/228 |
| 3,199,193 | A | * | 8/1965 | Norty | 30/228 |
| 3,693,254 | A | * | 9/1972 | Salonen | 30/228 |
| 4,747,212 | A | * | 5/1988 | Cavdek | 30/92 |
| 5,104,350 | A | * | 4/1992 | Morlack et al. | 452/64 |
| 5,867,909 | A | * | 2/1999 | Jeltsch et al. | 30/228 |
| 6,044,564 | A | * | 4/2000 | Jeltsch | 30/228 |
| 6,378,217 | B1 | * | 4/2002 | Takamura et al. | 30/362 |

FOREIGN PATENT DOCUMENTS

JP       6-75618       10/1994

* cited by examiner

Primary Examiner—Kenneth E. Peterson
(74) Attorney, Agent, or Firm—Sughrue Mion, PLLC (57) ABSTRACT

A reciprocal-movement power tool includes a movable blade reciprocally movably provided on a main body. A receiving plate that supports an angle iron to be cut is supported on the main body at a position in front of the movable blade. The movable blade is fixed on a front tip of a rod-shaped shuttle screw. The shuttle screw moves back and forth in the axial direction within a tubular screw shaft. The screw shaft is carved with a female screw portion and is rotated through a joint spindle that is deceleratingly rotated upon rotation of the motor through a deceleration means. The shuttle screw has a male screw portion that is threadingly engageable with the female screw portion.

7 Claims, 6 Drawing Sheets

RECIPROCAL-MOVEMENT POWER TOOL

TECHNICAL FIELD

The present invention relates to an electrically powered reciprocal-movement tool, and more particularly to a reciprocal-movement power tool that can be used as a cutting device, a crimp tool and a calking gun. The cutting device is adapted for cutting an angle iron such as light weight ceiling bars, which are steel furrings for wall and ceiling in buildings. The crimp tool is adapted for crimping terminals, and the calking gun is adapted for ejecting calking material. Hereinafter, a reciprocal-movement tool will be described in the form of a cutting device for cutting the steel furrings for wall and ceiling in buildings.

BACKGROUND ART

In building construction, there is a light-weight steel frame ceiling made by suspending hanging bolts from a ceiling slab, using the hanging bolt to assemble ceiling bars and ceiling bar supports into a lattice, and suspending boards on the lattice. The ceiling bars and ceiling bar supports used in this ceiling are defined by JIS in the classification of steel furrings for wall and ceiling in buildings. The steel furrings are plate-shaped steel having a thickness of 0.5 mm that is formed by bending into a U shape. Hereinafter, the steel furrings will be referred to as an angle iron.

Conventionally, angle irons are cut to match the length of boards using a power grinder, for example. Because the grinder is power driven, the angle iron can be cut in just a few seconds. However, grinding dust and chips may be scattered around ambient objects and sparks may fly around due to high speed rotation of the grinding stone.

A hand-driven tool for overcoming this problem is disclosed in Japanese Patent-Application Publication HEI-9-108931. The hand-driven tool includes a reception plate and a movable blade. The reception plate is for supporting the angle iron and matches the shape of the angle iron to be cut. The movable blade is disposed in confrontation with the reception plate. The movable blade has thin and sharp blade tip, and is capable of reciprocal movement. By manually operating a lever several times, the movable blade moves toward the reception plate, so that the angle iron that is supported by the reception plate is pressingly cut by shearing force. Because the angle irons are pressingly cut by the movable blade, this device has the merit of not generating cutting dust. On the other hand, there are problems in that the user's hand can become tired because the device is manually operated and also cutting takes a long time to complete.

It is conceivable to make the device into a power tool for eliminating the problem of the user's hand getting tired and for reducing cutting time. However, making the device into an electric power tool involves the following problems.

First, a large space is required for setting the angle iron between the reception plate and the movable blade. Because the movable blade must be moved by the distance of the space, the time required for cutting is increased and safety measures must be considered to prevent objects from entering into the space while the angle iron is being cut. Also, although a great cutting force of 600 to 800 Kg is needed, it is extremely difficult to secure such a large cutting force. It is conceivable to use hydraulics but this would made the configuration complex and expensive.

Taking the above-described problems into account, it is an object of the present invention to provide an inexpensive electrically powered reciprocal-movement power tool capable of providing a large cutting force using a simple configuration and without generating cutting dust.

DISCLOSURE OF THE INVENTION

In order to achieve these objects, the present invention provides a reciprocal-movement power tool characterized by including a main body, a motor fixed to the main body, deceleration means disposed in the main body and connected to the motor, an output shaft connected to the deceleration means and rotating in a decelerated manner, a feed screw shaft, a movement shaft, a movable body mounted on a tip end of the movement shaft, and a fixed body. The feed screw shaft is rotatably supported on the main body and is connected to the output shaft so as to rotate with the output shaft. The feed screw shaft has a first screw portion. The a movement shaft is disposed coaxially with the feed screw shaft and has a second screw portion that threadingly engages the first screw portion of the feed screw shaft. The movement shaft moves back and forth in an axial direction thereof by the threading movement of the second screw portion relative to the first screw portion. The fixed body is supported on a front side of the main body. The movable body moves back and forth with respect to the, fixed body by the movement of the movement shaft.

The movable body can move forward with a large load of about 600 to 800 kg by the rotational advancing force of the screw. Also, the device is power driven, not manually driven. Therefore, operations can be performed speedily and efficiently without tiring the operator. Also, the back and forth movement of the movable body can be achieved by merely switching the rotational direction of the screw shaft and a large force can be generated even during the backward movement of the movable body.

Here, by making the fixed body a receiving plate supporting a workpiece and the movable body a movable blade having a blade portion at its front end, the reciprocal-movement power tool can be a cutting device that moves the movable blade toward the receiving plate to cut the workpiece with a shearing cut. In this case, because as described above, the movable blade can move forwardly with a large load by rotational advancing force of the screw, no cutting dust or sparks are generated so the operation environment is greatly improved. Also, because a large force can be generated when the movable blade moves backward, the movable blade can be forcibly pulled back even if the movable blade catches on burs and the like at the time of cutting. Consequently, operability can be improved.

In case of the cutting device, it is desirable that a holder for covering around the movable blade be fixed to the front side of the main body, and that the receiving plate be attached so as to be capable of selectively being pivoted and fixed with respect to the holder.

Accordingly, because the receiving plate is pivotably provided to the holder, and is not moved in the cutting direction as in the conventional device, then if, for example, the receiving plate can be pivoted substantially perpendicular to the cutting direction, then a large working space can be opened up below the receiving plate when the angle iron is to be inserted into the receiving plate, so that operations for inserting the angle iron can be simplified. Further, when the angle iron is set in the receiving plate, the receiving plate can be disposed out of the forward movement direction of the movable blade. Therefore, safety is assured even if the movable blade moves forward.

Further, it is desirable that the feed screw shaft is in a form of a hollow tube having an inner peripheral surface sectioned into a front non-screw portion, an intermediate female screw portion serving as the first screw portion, and a rear non-screw portion. It is also desirable that the movement shaft is in a form of a rod-shaped member disposed within the hollow-tube, the rod shaped member having an outer peripheral surface sectioned into a male screw portion serving as the second screw portion, the male screw portion and the female screw portion being screwingly engaged at only a predetermined region, and the female screw portion being disengaged from the male screw portion at regions other than the predetermined region so that the feed screw shaft rotates idly.

By setting the positional relationship with respect to axial lengths of the male screw portion and the female screw portion so that threading engagement between the male screw portion and the female screw portion is released when cutting is completed and when the movable blade moves back to its initial position, the feed screw portion will rotate idly only at such disengagement phases. Therefore, the motor will not lock even if rotation of the motor is continued. This facilitates control to the main switch. No complicated clutch mechanism is needed, yet an inexpensive cutting device can be provided.

Further, it is desirable that the feed screw shaft is supported movable in an axial direction with respect to the main body, and the feed screw shaft and the output shaft are connected through a groove and a pin movably engaged with the groove, the groove extending in a slanting direction with respect to the axial direction of the feed screw shaft, movement of the feed screw shaft in the axial direction being started for permitting the female screw portion to become engaged with the male screw portion upon sliding movement of the pin along the groove when the rotational direction of the output shaft is switched.

Because the groove extends at a slant with respect to the axial direction of the feed screw shaft and the pin is engaged with the groove, each time the rotation of the motor is reversed the pin generates a force for moving the feed screw shaft forward or backward in the axial direction. This causes threading engagement of the female screw portion with the male screw portion so that idle rotation of the feed screw shaft is terminated to again move the movable body.

Further, by making the fixed body a die supporting a terminal to be crimped and the movable body a punch, the reciprocal-movement power tool can be operated as a crimping device that crimps the terminal by moving the punch toward the die.

Also, by making the fixed body a cylinder accumulating calking material and the movable body a piston moving within the cylinder, the reciprocal-movement power tool can be operated as a calking gun that ejects out the calking material from the cylinder upon movement of the piston.

As described above, the present invention enables a reciprocal-movement power tool to be provided inexpensively and with a simple configuration.

BRIEF DESCRIPTION OF THE DRAWINGS

In the drawings,

FIGS. 4(a) through 4(f) are explanatory viewing showing essential portions for description of operation principles of the cutting device of FIG. 1, in which FIG. 4(a) indicates a condition after the blade moves to the rearmost position;

BEST MODE FOR CARRYING OUT THE INVENTION

Below an angle iron cutter according to an embodiment of the present invention will be described with reference to FIGS. 1 to 6. A main body of the cutter includes a motor chamber 1 that houses a motor 5, a housing 3 disposed in a T-shape in combination with a handle 2, and a gear cover 16. A storage battery 4 is detachably provided to the lower portion of the handle 2. A main switch 6 and a push button 7 are provided to the handle 2. The main switch 6 is for starting and stopping application of electric current to the motor 5. The push button 7 is for switching the polarity of voltage supplied to the motor 5 to change the rotational direction of the motor 5.

Figure 1:
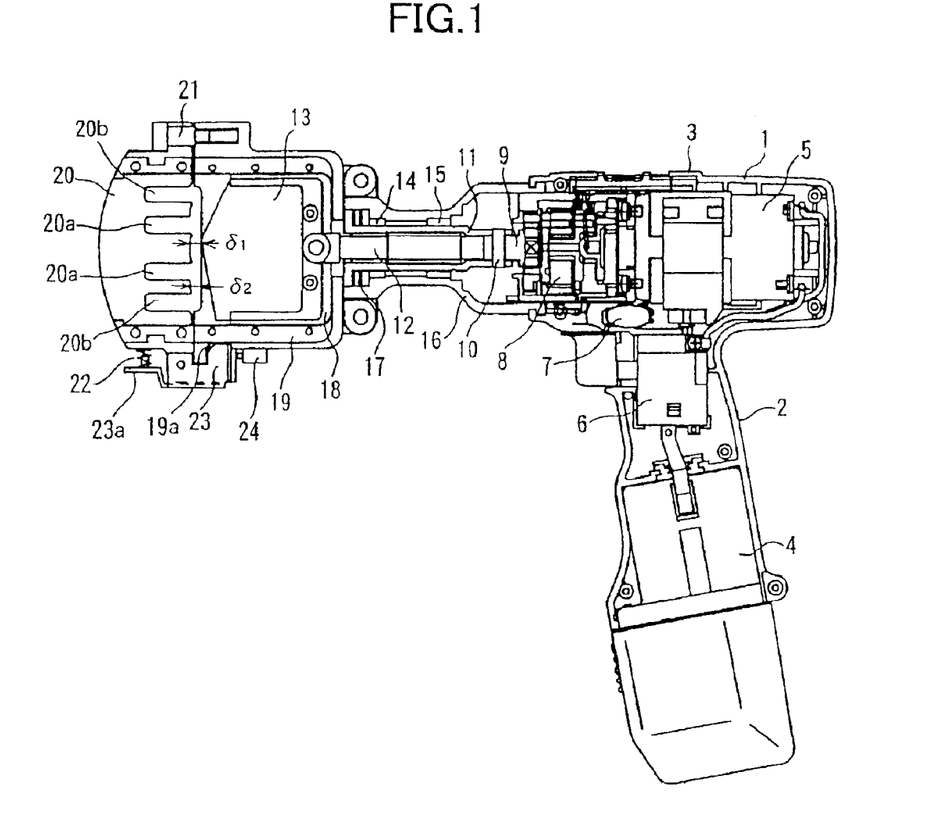
FIG. 1 is a side cross-sectional view showing an embodiment wherein the reciprocal-movement power tool of the present invention is applied to an angle iron cutting device.

The gear cover 16 is fixed to the front end of the housing 3. A holder 19 is fixed to the front end of the gear cover 16. Three stage planetary gear train 8, a joint spindle 9, a pin 10, a screw shaft 11, and a shuttle screw 12 are provided within the housing 3 and the gear cover 16. The joint spindle 9 configures an output shaft of the present invention. The screw shaft 11 configures a feed screw shaft of the present invention. The shuttle screw 12 configures a movement shaft of the present invention. Also, a movable blade 13 is movably disposed in the holder 19. The three stage planetary gear train 8 connected to the joint spindle 9 is for decelerating rotation of the motor 5 by about $\frac{1}{100}$. As will be described later, the joint spindle 9 is connected to the screw shaft 11 by the pin 10. The shuttle screw 12 is selectively connected to the screw shaft 11. The movable blade 13 is fixed to the front end of the shuttle screw 12.

Figure 5:
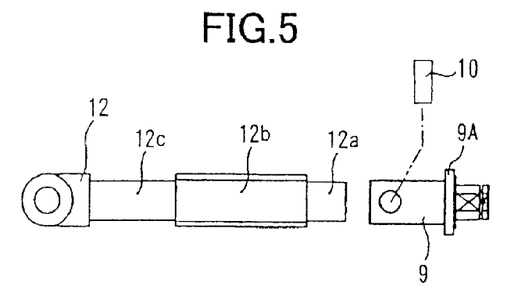
FIG. 5 is a side view showing a shaft screw and a joint spindle that configure the cutting device of FIG. 1.

As shown in FIG. 5, a flange 9A is provided on the rear end of the joint spindle 9. The pin 10 is force-fitted with the front end portion of the joint spindle 9 in the radial direction of the joint spindle 9 and fixed in place there so as to protrude radially outwardly.

Figure 6:
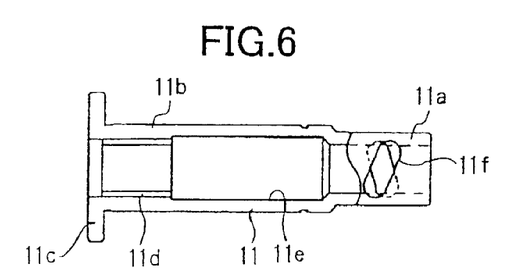
FIG. 6 is a side view showing a screw shaft that configures the cutting device of FIG. 1.

The screw shaft 11 has a hollow cylindrical configuration including a rear small-diameter sleeve portion 11a, a front large-diameter sleeve portion 11b, and a front-end flange portion 11c. The rear small-diameter sleeve portion 11a is loosely fitted to the outer periphery of the joint spindle 9. The rear end face of the screw shaft 11 is disposed capable of abutment with and separation from the flange 9A of the joint spindle 9. The screw shaft 11 is rotatably supported in the gear cover 16 through metal bearings 14, 15 at two positions, one forward and one rearward. A thrust needle bearing 17 is provided between the flange portion 11c of the screw shaft 11 and the metal bearing 14. The front portion of the screw shaft 11 is thus supported by thrust needle bearing 17 so as to be movable with respect to the gear cover 16 in the axial direction within a predetermined range.

Figure 4A:
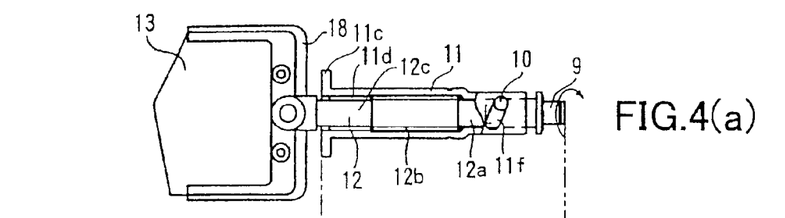

A right-handed female screw portion 11d is engraved into the inner peripheral surface at the front side of the front large-diameter portion. The cross-section of the female screw 11d has a trapezoidal shape. The inner peripheral surface of the large-diameter portion 11b between the female screw 11d and the rear small-diameter sleeve portion 11a forms a non-screw portion lie with an inner diameter that is larger than that of the female screw portion 11d. It should be noted that no male screw portion is carved in the inner peripheral surface of the front-end flange portion 11c. Two slots 11f are formed at 180 degree symmetrical positions in the rear small-diameter sleeve portion 11a. The slots 11f are slanted at an approximately 45 degree angle with respect to the axial direction of the screw shaft 11. The slant direction of the slots 11f is a leftward slant (FIG. 4). Said differently, when viewed from the right-hand rotational direction centered on the axial center of the screw shaft 11, the slots 11f are slanted so that the rotational direction tip sides of the slots 11f are closer to the rear end of the screw shaft 11 and the rotational direction rear sides of the slots 11f are closer to the front of the screw shaft. It should be noted that if the female screw portion 11d is a left-hand screw, then the slanting direction of the slots 11f should be a rightward slant. The pin 10 that protrudes from the joint spindle 9 slidingly engages in the slots 11f. The rotation of the joint spindle 9 is transmitted to the screw shaft 11 through the pin 10.

The shuttle screw 12 is axially movable in the screw shaft 11 coaxially therewith. The shuttle screw 12 is configured integral from a rear side cylindrical shaft portion 12a, a male screw portion 12b, and a front side cylindrical shaft portion 12c. The male screw portion 12b has a trapezoidal shaped male screw, and is positioned between the cylindrical shaft portions 12a and 12c, and is threadingly engageable with the female screw portion 11d of the screw shaft 11. The axial lengths of the front side cylindrical shaft portion 12c, the rear side cylindrical shaft portion 12a, the male screw portion 12b, the female screw portion 11d, and the non-screw portion 11e are set so that the screw shaft 11 can idly rotate when the male screw portion 12b is disengaged from the female screw portion 11d of the screw shaft 11 while the shuttle screw 12 is in its most retracted position providing a retracted position of the movable blade 13, and so that the screw shaft 11 can idly rotate when the male screw portion 12b is disengaged from the female screw portion 11d of the screw shaft 11 while the shuttle screw 12 is in its forward-most position providing a forward position of the movable blade 13.

The movable blade 13 is a keen blade with edge thickness of about 1.2 mm. The movable blade 13 is fixed to the blade holder 18 by two screws not shown in the drawings. The blade holder 18 is fixed to the front of the shuttle screw 12 and is supported so as to be reciprocally movable within the holder 19 following guide grooves not shown in the drawings formed in the holder 19. A latch engagement portion 19a is formed in the side portion of the holder 19.

Figure 2:
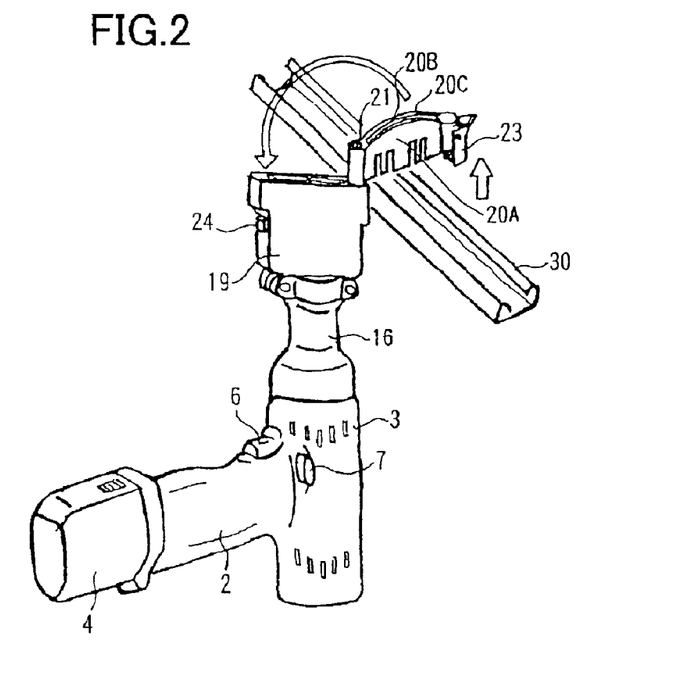
FIG. 2 is a perspective view showing the condition of the cutting device of FIG. 1 before a cutting operation.

A receiving plate 20 is supported to the holder 19 in the front-side in the forward movement direction of the movable blade 13. As shown in FIG. 1, the receiving plate 20 is provided with a total of four grooves 20a, 20b, a pair of grooves 20a in which a narrow-width angle iron is fitted and a pair of grooves 20b in which a broad-width angle iron is fitted. As shown in FIG. 2, the receiving plate 20 has a pair of receiving plate members 20A, 20B that mutually confront each other. A space 20C is provided in between the receiving plate members 20A and 20B so as to enable the blade holder 18 to pass therethrough.

One end of the receiving plate 20 is pivotably supported on the holder 19 about a pivot shaft 21. A latch 23 is attached to a free end of the receiving plate 20. The latch 23 is engageable with the latch engagement portion 19a of the holder 19. A lever 23a is provided on the latch 23. The lever 23a is connected to a spring 22 and is urged to pivot in a predetermined direction. Accordingly, the receiving plate 20 is pivotable between an open condition (FIG. 2) open 90 degree centered on the shaft 21 and a closed condition (FIG. 3) wherein the receiving plate 20 is parallel with the holder 19. When in the closed condition, the latch 23 catches on the latch engagement portion 19a of the holder 19 so that the receiving plate 20 can be prevented from opening. Also, by pressing the lever 23a of the latch 23 against urging force of the spring 22, the latch 23 is disengaged from the latch engagement portion so that the receiving plate 20 can switch into its open condition. When the receiving plate 20 is in the closed condition, a gap $\delta 1$ between the movable blade 13 and the receiving plate 20 is 8 mm or less even when the movable blade 13 is in the most retracted position. The gap $\delta 1$ is set to a dimension so that fingers and the like cannot enter therethrough. When the receiving plate 20 is in the closed condition, a gap $\delta 2$ between the front-end opening edge of the holder 19 and the receiving plate 20 is also 8 mm or less. A microswitch 24 is provided on the opposite side of the lever 23a with respect to the latch 23. The microswitch 24 is connected in series with the main switch 6. The microswitch 24 is pressed by the latch 23 and is turned ON when the latch 23 is engaged with the latch engagement portion 19a, and is turned OFF when the latch 23 is moved away from the microswitch 24. The motor 5 will not rotate as long as the microswitch 24 is not turned ON regardless of the manipulation of the main switch 6.

Next, the operations of the above-described angle iron cutter will be described.

As shown in FIG. 2, the receiving plate 20 is opened about the pivot shaft 21 to 90 degrees with respect to the movable blade 13. At this time, a space sufficient for enabling the angle iron 30 to be cut to pass through is opened below the receiving plate 20. Because the microswitch 24 is in an OFF condition, the motor 5 will not rotate even if the main switch 6 is erroneously manipulated. On the other hand, even if the motor 5 accidentally rotates so that the movable blade 13 moves forward, there is no danger that objects, such as hands, will be cut even if the objects are located in front of the movable blade 13 because the receiving plate 20 is not in front of the movable blade 13.

Figure 3:
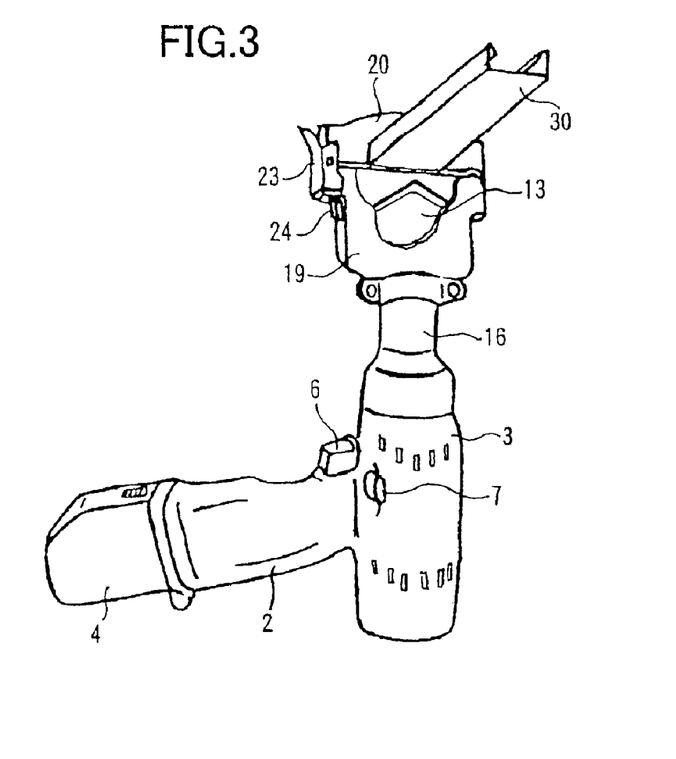
FIG. 3 is a perspective view showing a cutting operation condition of the cutting device of FIG. 1.

Next, the angle iron 30 is set in the grooves 20a or the grooves 20b of the receiving plate 20 and the main body is rotated 90 degree to let the movable blade 13 direct in parallel with the receiving plate 20. As a result, as shown in FIG. 3 the latch 23 catches on and is held in the latch engagement portion 19A of the holder 19. At this time, because the latch 23 is urged by the spring 22, the latch 23 will not separate from the latch engagement portion 19a and the receiving plate 20 will not open up. The microswitch 24 provided on the holder 19 is pressed by the latch 23 into ON condition so that the motor 5 can be rotated by manipulation of the main switch 6. Because the gap δ1 between the receiving plate 20 and the movable blade 13 is set to 8 mm or less as described above, there is no danger that objects, such as fingers, will enter.

When the main switch 6 is manipulated, the motor 5 rotates at 20,000 R.P.M. This rotation is decelerated by the three-stage planetary gear train 8 to about ⅟₁₀₀. Rotation of the three-stage planetary gear train 8 is transmitted to the joint spindle 9 and the screw shaft 11 rotates leftward by engagement between the pin 10 and the slots 11f. It should be noted that the pin 10 is maintained in a condition in abutment against the left end portion (front-side end portion) of the slots 11f.

Figure 4B:
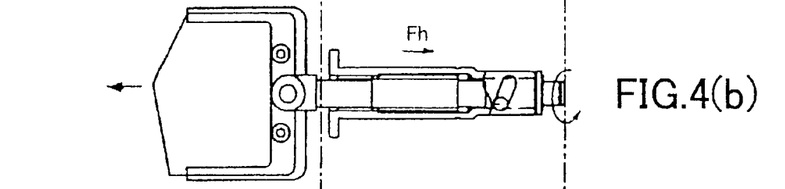
FIG. 4(b) indicates a condition when the blade starts moving forward.
Figure 4C:
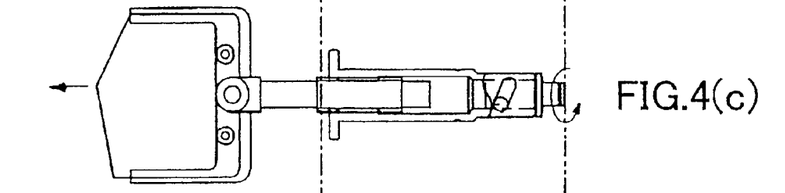
FIG. 4(c) indicates a cutting condition wherein the blade is moved forward to cut an angle iron.

FIG. 4(c) shows cutting phase upon frontward movement of the blade for cutting the angle iron. In this condition, because the female screw portion 11d of the screw shaft 11 and the male screw portion 12b of the shuttle screw 12 are in screwing engagement, leftward rotation of the screw shaft 11 presses the movable blade 13, which is connected to the shuttle screw 12, forward by a force of 600 to 800 kg. The movable blade 13 cuts into and severs the angle iron 30. Because the movable blade 13 is sharp and moves slowly, no sparks will be emitted. Also, because it is a shearing cut, no cutting dust will be generated.

Figure 4D:
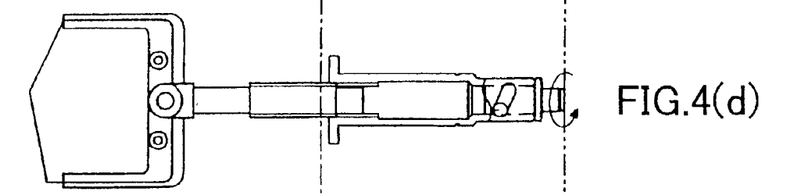
FIG. 4(d) indicates a condition immediately after cutting is completed.

FIG. 4(d) shows the condition after the movable blade 13 is moved forward about 40 mm and cutting is complete. In this condition, the male screw portion 12b of the shuttle screw 12 is disengaged from the female screw portion 11d of the screw shaft 11 and the rear side cylindrical shaft portion 12a is positioned within the female screw portion 11d. Therefore, even if leftward rotation of the screw shaft 11 continues, the screw shaft 11 will merely rotate idly and the shuttle screw 12 will not move forward. Because of this, even if the operator pulls the main switch 6 after cutting is complete, the motor 5 will not lock up.

Figure 4E:
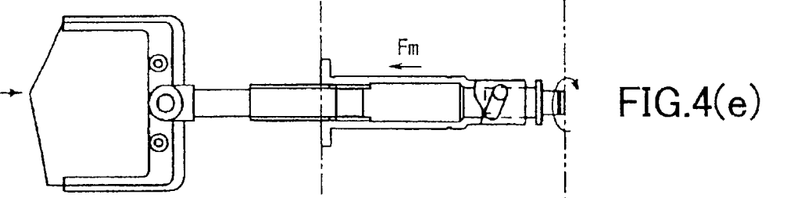
FIG. 4(e) indicates a condition when the blade starts moving rearward after cutting the angle iron.
Figure 4F:
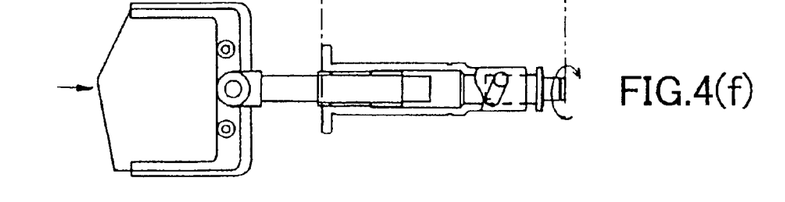
FIG. 4(f) indicates the condition of the blade moving rearward.

Next, the return operation of the movable blade 13 will be described. When the push button 7 is pressed and polarity of voltage applied to the motor 5 is reversed, and then the main switch 6 is pulled, direction of current flowing into the motor 5 reverses so that the motor 5 rotates in the opposite direction. Accordingly, the joint spindle 9 rotates in reverse to the right. The male screw portion 12b of the shuttle screw 12 is not screwingly engaged with the female screw portion 11d of the screw shaft 11. Therefore, even if the screw shaft 11 rotates rightward, the screw shaft 11 will only rotate idly. However, because the pin 10 of the joint spindle 9 is slidingly engaged in the slots 11f, which slant at 45 degree angles, the rightward rotation of the joint spindle 9 causes sliding movement of the pin 10 from the front-side end portion to the rear-side end portion of the slots 11f. As a result of this operation, the screw shaft 11 is subjected to a forward pressing force Fm as shown in FIG. 4(e). By this pressing force, rightward rotation of the screw shaft 11 starts to threadingly engage the female screw portion 11d of the screw shaft 11 with the male screw portion 12b of the shuttle screw 12 and, as shown in FIG. 4(f), the shuttle screw 12 is forcedly pulled into the screw shaft 11 and the movable blade 13 retracts. The returning force of the shuttle screw 12 generated at this time is sufficiently strong because of the axial moving force is provided by the screw engagement. Therefore, the movable blade 13 can be forcibly returned back even if there is a large friction force due to deep thrusting of the movable blade 13 into the severed angle iron 30.

When the movable blade 13 has completed retracting back by about 40 mm, then as shown in FIG. 4(a), the male screw portion 12b of the shuttle screw 12 is disengaged from the female screw portion 11d of the screw shaft 11 and the front side cylindrical shaft portion 12c of the shuttle screw 12 is positioned within the female screw portion 11d. In this condition, the screw shaft 11 will merely rotate idly and the shuttle screw 12 will not retract even if the screw shaft 11 continues to rotate to the right. By this, there is no danger that the motor 5 will lock up even if the operator pulls on the main switch 6 after the movable blade 13 has returned.

The latch 23 is removed from the latch engagement portion 19a by pressing the lever 23a. By pivoting the receiving plate 20 by 90 degrees, the lower side of the receiving plate 20 is opened up and the angle iron 30 can be removed. Because the microswitch 24 is turned OFF at this time, the motor 5 will not rotate even if the main switch 6 is erroneously operated. Therefore, the device is safe. Even if the motor 5 rotates for some reason and the movable blade 13 moves forward, the receiving plate 20 still remains at a positional relationship shifted by 90 degrees relative to the movable blade 13. Therefore, there is no danger of objects being interposed between the movable blade 13 and the receiving plate 20.

Next, when another angle iron 30 is to be cut, the new angle iron 30 is set in this condition, the tool body is rotated 90 degrees, and the receiving plate 20 is closed following the process described above. When the push button 7 is pressed to the forward rotation side to switch rotational direction of the motor 5 to forward rotation and the main switch 6 is turned ON, then the motor 5 rotates forward. Accordingly, the joint spindle 9 rotates leftward. As described above, because the male screw portion 12b of the shuttle screw 12 is disengaged from the female screw portion 11d of the screw shaft 11, the screw shaft 11 will only rotate idly even if the screw shaft 11 rotates to the left. However, because the pin 10 of the joint spindle 9 is slidingly engaged with the slots 11f, which slant at 45 degree angles, leftward rotation of the joint spindle 9 causes sliding movement of the pin 10 from the rear-side end portion of the slots 11f to the front-side end portion thereof. As indicated in FIG. 4(b), a rearward pressing force Fh is generated on the screw shaft 11 during this sliding movement of the pin. As a result, leftward rotation of the screw shaft 11 starts to provide engagement of the female screw portion 11d of the screw shaft 11 with the male screw portion 12b of the shuttle screw 12. Thus, as shown in FIG. 4(c), the shuttle screw 12 is forcibly pressed out and the movable blade 13 cuts the angle iron 30.

The above-described angle iron cutter achieves the following effects:

(1) The receiving plate 20 supports the angle iron 30 to be cut. Also, the thin movable blade 13 is reciprocally moved and pressingly cuts by a large pressing force generated by axially advancing rotation force of a screw. Therefore, no cutting dust or sparks are generated so the operation environment is greatly improved.

(2) The movable blade 13 moves reciprocally by a large load of 600 to 800 Kg. However, this is power driven, not manually driven. Therefore, cutting can be much more speedily and efficiently performed without the operator tiring.

(3) The receiving plate 20 is pivoted about the shaft 21 in a direction that is substantially perpendicular to the cutting direction, not in the cutting direction in the manner of the conventional device. The receiving plate 20 and the movable blade 13 are shifted by 90 degrees when the angle iron 30 is inserted. Therefore, a large working space is opened below the receiving plate 20 so that the angle iron 30 can be easily set. Also, after the tool body is rotated by 90 degrees to bring the receiving plate 20 and movable blade 13 into a parallel relationship, the gap 61 between receiving plate 20 and the movable blade 13 or the gap 62 between the receiving plate 20 and the holder 19 is narrow such as 8 mm or less. Thus safety increases because there is no large space at the gap, thereby eliminating or reducing possibility of insertion of objects into the gap.

(4) The motor 5 rotates the screw shaft 11, which is carved with the female screw portion 11d, and the movable blade 13 is pressed through the shuttle screw 12, which has the male screw portion 12b in screwing engagement with the female screw portion 11d. Therefore, a large cutting force can be generated from a small rotational force.

(5) Moving direction of the movable blade 13 can be changed by merely switching rotational direction of the screw shaft 11, and a large force can be generated during return stroke of the movable blade 13. Therefore, the movable blade 13 can be forcibly returned even if the movable blade 13 gets stuck on burs and the like generated during cutting, so that operability can be enhanced.

(6) By properly setting dimensional relationship between the male screw portion 12b and the female screw portion 11d, screwing engagement between the female screw portion 11d and the male screw portion 12b can be released when cutting is completed and when the movable blade 13 returns to its initial position, so the screw shaft 11 can idly rotate. Therefore, the motor 5 will not lock up even if the motor 5 continues to rotate. Also, control to the main switch 6 is also simple and there is no need for a complicated clutch mechanism. Thus, resultant cutting device can be inexpensively provided.

(7) The approximately 45 degree angle slots 11f are formed in the screw shaft 11, and the pin 10 protruding from the joint spindle 9 is engaged with the slots 11f. Therefore, forward movement and retracting forces Fm and Fh are generated in the axial direction by rotating the joint spindle 9 forwardly and reversely. Because the direction of thrust force in the rotational direction matches the screw engagement direction, the force Fm is generated that threadingly engages the female screw portion 11d with the male screw portion 12b when forward rotation is shifted to reverse rotation. The screw portions can be smoothly threadingly engaged by this reverse rotation. Also, when the rotating direction is changed from the reverse rotation to the forward rotation at the time of idle rotation of the screw shaft 11, the force Fh is generated that threadingly engages the male screw portion 12b with the female screw portion 11d. Therefore, through the forward rotation, the screw portions can be smoothly threadingly engaged with each other.

(8) The angle iron 30 is set after the receiving plate 20 is pivoted 90 degrees. Therefore, the receiving plate 20 can be positioned so that it is not in front of the movable blade 13 when the angle iron is set. It will be safe even if the movable blade 13 moves forward. Also, in this condition the microswitch 24 is in an OFF condition. Therefore, the movable blade 13 will not move even if the main switch 6 is erroneously operated, so safety device results.

Figure 7:
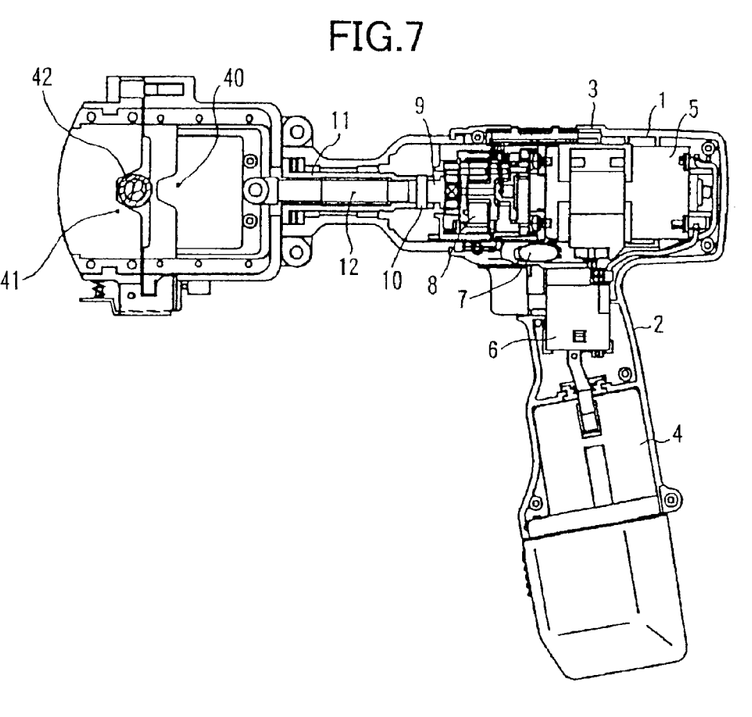
FIG. 7 is a side cross-sectional view showing a second embodiment wherein the reciprocal-movement power tool of the present invention is applied to a crimping device.

FIG. 7 shows a second embodiment wherein the present invention is applied to a crimping device. In FIG. 7, like parts and components are designated by the same reference numerals as those shown in FIGS. 1 through 6. Instead of the movable blade 13 of the first embodiment, a punch 40 is connected to the shuttle screw 12. Instead of the receiving plate 20 of the first embodiment, a die 41, in which a terminal 42 can be mounted, is pivotably supported on the holder 19. The terminal 42 can be crimped by pressing the punch 40 against the terminal 42 supported in the die 41.

Figure 8:
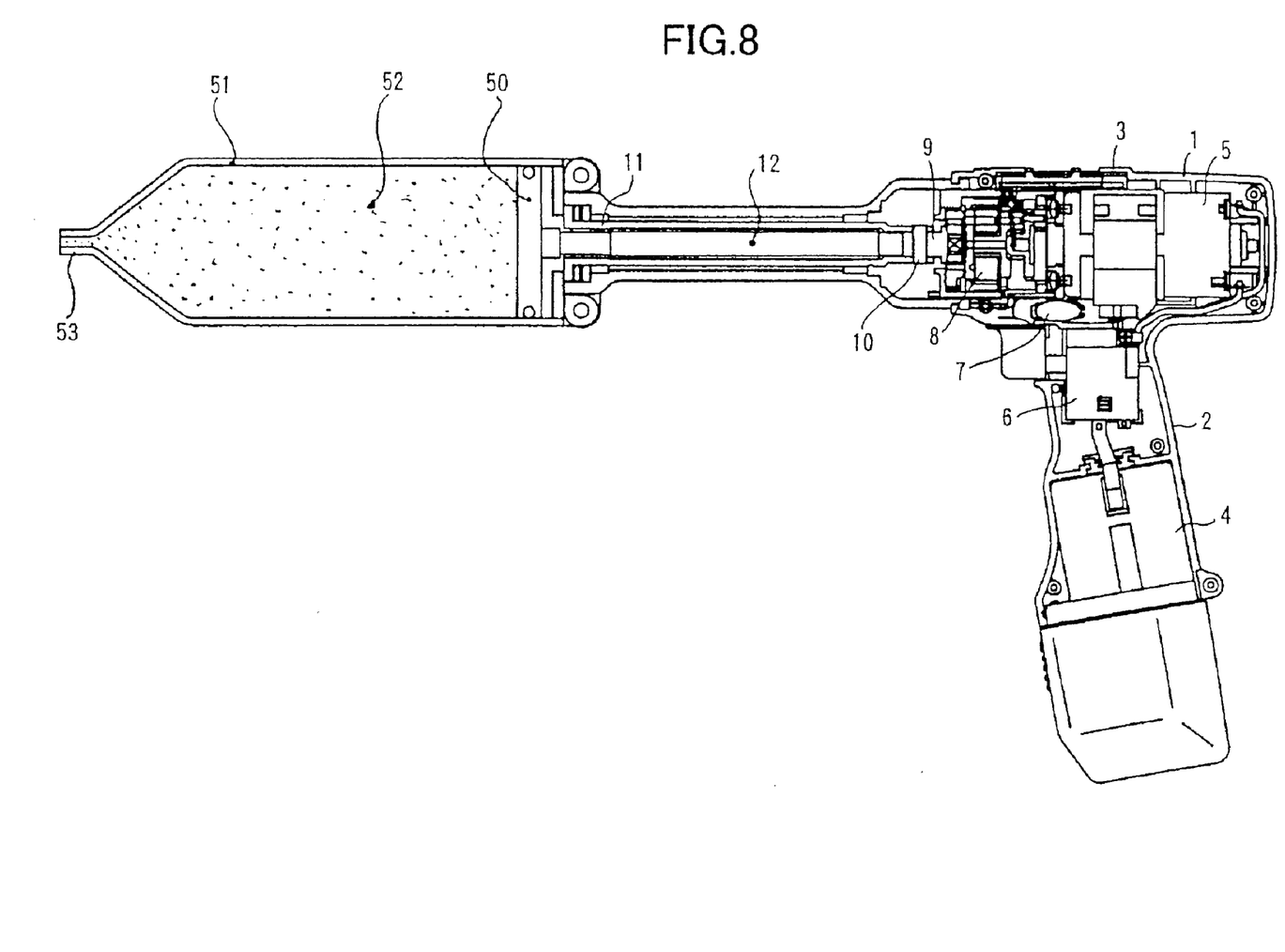
FIG. 8 is a third embodiment wherein the reciprocal movement power tool of the present invention is applied to a calking gun.

FIG. 8 shows a third embodiment that applies the present invention to a caulking gun. The movable blade 13 and the receiving plate 20 of the first embodiment are replaced by a piston 50 and a cylinder 51, respectively. By moving the piston 50 forward, caulking agent filled in the cylinder 51 can be ejected out from a nozzle 53 at the front end of the cylinder.

In the above-described first to third embodiments, the rotational direction of the motor 5 is changed by manipulating the push button 7. However, by using a circuit configuration shown in FIG. 9, the push button 7 can be dispensed with. By merely manipulating the main switch 6, rotational direction of the motor 5 can be switched and a series of operations can be performed. In the motor power supply circuit shown in FIG. 9, the power source 4, the motor 5, a resistor 63, and the main switch 6 are serially connected. The resistor 63 is connected at one end to ground and at the other end to an inverting terminal of an amplifier 64 through a resistor. A non-inverting terminal of the amplifier 64 is grounded. The amplifier 64 is connected to a microcomputer 62. A three-terminal regulator 60, one end of which is connected to ground, and a smoothening capacitor 61 are connected to the microcomputer 62 for supplying a rated voltage to the microcomputer 62. The microcomputer 62 includes an A/D input port and an output port. The A/D input port receives input of voltage from the amplifier 64. The output port includes a first output terminal 62A and a second output terminal 62B. The first output terminal 62A is connected to a first transistor 65 through a resistor. The first transistor 65 is connected to a first relay coil 67, which is in parallel with the motor 5. The second output terminal 62B is connected to a second transistor 66 through a resistor. The second transistor 66 is connected to a second relay coil 68 which is in parallel with the motor 5. A pair of motor-forward-rotation contacts 67a, 67a are operatively associated with the first relay coil 67. The contacts 67a, 67a are disposed in series to the front and rear of the motor 5. A pair of motor-reverse-rotation contacts 68a, 68a are operatively associated with the second relay coil 68. The contacts 68a, 68a are disposed in series to the front and rear of the motor 5. Upon energization of the first relay coil 67 by turning ON the first transistor 65, the motor-forward-rotation contacts 67a, 67a are closed while the open condition of the motor-reverse-rotation contacts 68a, 68a is maintained. As a result, electric current flows in one direction in the motor 5. On the other hand, upon energization of the second relay coil 68 by turning ON the second transistor 66, the motor-reverse-rotation contacts 68a, 68a are closed while the open condition of the motor-forward-rotation contacts 67a, 67a is maintained. As a result, electric current flows in the opposite direction in the motor 5.

Figure 9:
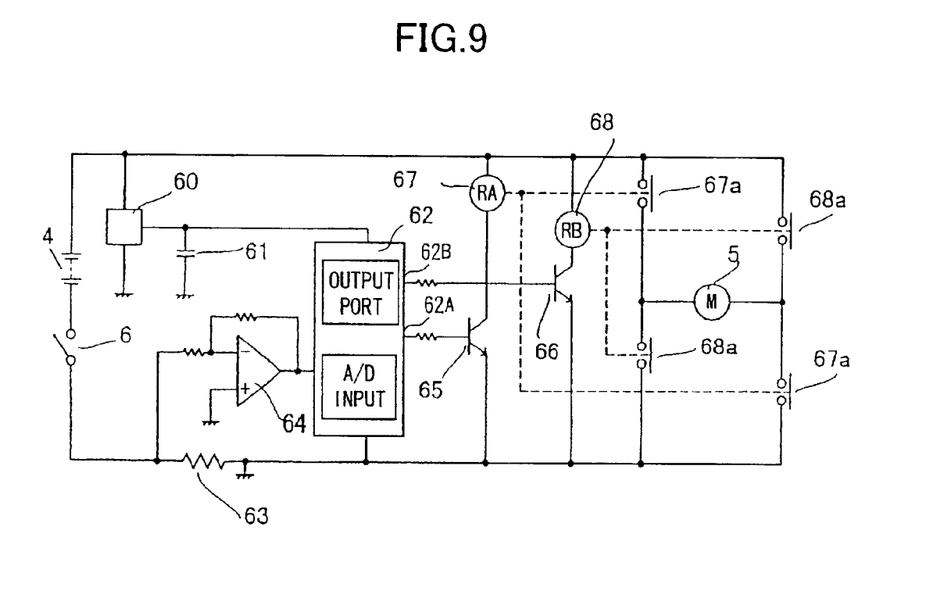
FIG. 9 is a diagram of electric circuitry of a reciprocal-movement power tool according to the present invention for switching a motor between forward and reverse rotation by manipulating only a main switch, without providing a push switch.

The microcomputer 62 is configured to (a) output a high-level signal from the first output terminal 62A and a low-level signal from the second output terminal 62B upon detection of turning ON the main switch 6 (b) to output a low-level signal from the first output terminal 62A and a high-level signal from the second output terminal 62B by input of a DC current, whose level is lower than a predetermined current level, from the amplifier 64 according to a rapid reduction on the motor load as a result of idle rotation of the screw shaft 11 at the completion of cutting (c) and to output a low-level from the first output terminal 62A and from the second output terminal 62B in response to the second input of a DC current whose current level is lower than the predetermined current level according to the disengagement of the screw shaft 11 at a terminal phase of the return stroke of the movable blade 13.

With the above-described configuration, when the microcomputer 62 detects that the main switch 6 is turned ON, the high-level signal is output from the first output terminal 62A and the low-level signal is output from the second output terminal 62B. Thus, the first transistor 65 is rendered ON, so that the first relay coil 67 is energized for closing the contacts 67a. Therefore, the motor 5 is rotated forward. As described above, as a result the shuttle screw 12 moves forward and the movable blade 13 cuts the angle iron 30.

Because the screw shaft 11 rotates idly when cutting is completed, a smaller current flows in the motor 5. The microcomputer 62 receives an output of the predetermined current value or less from the amplifier 64, and judges that the load on the motor 5 is smaller, and outputs a low-level signal from the first output terminal 62A, and outputs a high-level signal from the second output terminal 62B. Consequently, the first transistor 65 is rendered OFF for opening the contacts 67a, whereas the second transistor 66 is rendered ON, so that the second relay coil 68 is energized for closing the contacts 68a. As a result, reverse rotation of the motor 5 starts and the shuttle screw 12 retracts.

When the shuttle screw 12 retracts by a predetermined distance, the screw shaft 11 again rotates idly in the manner described above. The microcomputer 62 receives the second low current output level from the amplifier 64, judges that the load on the motor 5 has again become small, and outputs a low-level signal from the first output terminal 62A and the second output terminal 62B. As a result, the second transistor 66 is also rendered OFF and the motor 5 stops. This completes a series of operations.

Incidentally, a non-volatile memory (not shown) can be provided in the above circuit. When the main switch is turned OFF for temporarily stopping cutting operation, the condition of the microcomputer at the stopping phase thereof can be held in the non-volatile memory. When the main switch is again turned ON, operations restart from the time that the microcomputer was stopped and cutting operations continue from there. Alternatively, the number of times that current drops as described above can be counted, and idle rotation timing of the screw shaft 11 can be determined upon set or reset condition of flags, the determination being, made as to whether the screw shaft 11 is idly rotating at the immediate end timing of a cutting operation or whether the screw shaft 11 is idly rotating after the shuttle screw 12 moves to its retracting end.

With this configuration, cutting can be performed by merely maintaining the ON condition of the main switch 6. Therefore, there is no need to manipulate the push button 7 or to manipulate the main switch 6 at the time of reverse rotation. Thus, operability can be enhanced. Also, simple arrangement results because of elimination of the push button 7.

It should be noted that the reciprocating power tool according to the present invention is not limited to the above-described embodiments and can be modified in a variety of ways within the scope of the claims. For example, in the embodiments, the slanting slots 11f are formed in the tubular shaped screw shaft 11 and a pin 10 is provided in the joint spindle 9 for engagement with the slots 11f. However, a pin can be provided integrally to the screw shaft and a slanting groove that engages with the pin can be formed in the joint spindle. Also, the slots 11f are formed so as to penetrate through the tube wall of the screw shaft 11. However, grooves can be used instead of slots.

INDUSTRIAL APPLICABILITY

The electrically powered reciprocal tool according to the present invention can be applied to a broad range of mechanisms that moves a movable body back and forth with respect to a fixed body, such as a power cutting tool for cutting angle irons, a crimping tool for crimping terminals, and a calking gun for ejecting calking material.

What is claimed is:

1. A reciprocal-movement power tool comprising:

a main body;

a motor fixed to the main body;

deceleration means disposed in the main body and connected to the motor;

an output shaft connected to the deceleration means and rotating in a decelerated manner;

a feed screw shaft rotatably supported on the main body and connected to the output shaft so as to rotate with the output shaft, the feed screw shaft having a first screw portion;

a movement shaft disposed coaxially with the feed screw shaft and having a second screw portion threadingly engageable with the first screw portion of the feed screw shaft, the movement shaft moving back and forth in an axial direction thereof by the threading movement of the second screw portion relative to the first screw portion, the feed screw shaft also having a non-screw portion so that the feed screw shaft is capable of idle rotation when it is disengaged from the movement shaft while being disposed coaxially therewith;

a movable body mounted on a tip end of the movement shaft; and, a fixed body supported on a front side of the main body, the output shaft, the feed screw shaft, and the movement shaft being provided coaxially with one another, and the movable body moving back and forth with respect to the fixed body by the movement of the movement shaft; and further comprising a pin protruding from the output shaft, and wherein the feed screw shaft is formed with a slot slanted with respect to the axial direction of the screw shaft, the pin slidingly engaging and extending through the slot.

2. The reciprocal-movement power tool as claimed in claim 1, wherein the fixed body comprises a receiving plate supporting a workpiece, and the movable body comprises a movable blade having a blade portion at its front end, the movable blade being movable toward the receiving plate to cut a workpiece with a shearing cut.

3. The reciprocal-movement power tool as claimed in claim 2, further comprising a holder fixed to the front side of the tool body for covering around the movable blade, the receiving plate being supported to the holder and being selectively movable with respect to or selectively fixed to the holder.

4. The reciprocal-movement power tool as claimed in claim 1, wherein the fixed body comprises a die supporting a terminal to be crimped, and the movable body comprises a punch movable toward the die for crimping the terminal.

5. The reciprocal-movement power tool as claimed in claim 1, wherein the fixed body comprises a cylinder accumulating calking material, and the movable body comprises a piston moving within the cylinder for ejecting out the calking material from the cylinder.

6. A reciprocal-movement power tool comprising:

a main body;

a motor fixed to the main body;

deceleration means disposed in the main body and connected to the motor;

an output shaft connected to the deceleration means and rotating in a decelerated manner;

a feed screw shaft rotatably supported on the main body and connected to the output shaft so as to rotate with the output shaft, the feed screw shaft having a first screw portion;

a movement shaft disposed coaxially with the feed screw shaft and having a second screw portion threadingly engageable with the first screw portion of the feed screw shaft, the movement shaft moving back and forth in an axial direction thereof by the threading movement of the second screw portion relative to the first screw portion;

a movable body mounted on a tip end of the movement shaft; and, a fixed body supported on a front side of the main body, the movable body moving back and forth with respect to the fixed body by the movement of the movement shaft; and wherein the feed screw shaft is in a form of a hollow tube having an inner peripheral surface sectioned into a front non-screw portion, an intermediate female screw portion serving as the first screw portion, and a rear non-screw portion, wherein the movement shaft is in a form of a rod-shaped member disposed within the hollow-tube, the rod shaped member having an outer peripheral surface provided with a male screw portion serving as the second screw portion, the male screw portion and the female screw portion being screwingly engaged at only a predetermined region, and the female screw portion being disengaged from The male screw portion at regions other than the predetermined region so that the feed screw shaft rotates idly, and wherein the feed screw shaft is supported movable in an axial direction with respect to the main body, and the feed screw shaft and the output shaft are connected through a groove and a pin movably engaged with the groove, the groove extending in a slanting direction with respect to the axial direction of the feed screw shaft, movement of the feed screw shaft in the axial direction being started for permitting the female screw portion to become engaged with the male screw portion upon sliding movement of the pin along the groove when the rotational direction of the output shaft is switched.

7. A reciprocal-movement power tool comprising:

a main body;

a motor fixed to the main body;

deceleration means disposed in the main body and connected to the motor;

an output shaft connected to the deceleration means and rotatable in a decelerated manner;

a feed screw shaft rotatably supported on the main body and connected to the output shaft so as to rotate with the output shaft, the feed screw shaft having an intermediate portion provided with a first screw portion and remaining portion provided with a non-screw portion;

a movement shaft disposed coaxially with the feed screw shaft and having one end portion provided with a non-screw portion, an intermediate portion provided with a second screw portion threadingly engageable with the first screw portion of the feed screw shaft, and another end portion provided with a non-screw portion, the movement shaft moving back and forth in an axial direction thereof by the threading movement of the second screw portion relative to the first screw portion;

a movable body mounted on a tip end of the movement shaft;

a fixed body supported on a front side of the main body, the movable body moving back and forth with respect to the fixed body by the movement of the movement shaft, idle rotation of the motor occurring when the second screw portion disengages from the first screw portion;

rotational direction changing means for changing rotational direction of the motor by changing a direction of current supplied to the motor;

detection means detecting a current level flowing through the motor for detecting idle rotation of the motor; and, control means for changing rotational direction of the motor via the rotational direction changing means when the detection means detects idle rotation a first time and stopping rotation of the motor when the detection means detects idle rotation a second time.

* * * * *